United States Patent [12]

Nakajima (10) Patent No.: US 12,022,546 B2
(45) Date of Patent: Jun. 25, 2024

(54) COMMUNICATION APPARATUS, CONTROL METHOD, AND NON-TRANSITORY COMPUTER-READABLE STORAGE MEDIUM (71) Applicant: CANON KABUSHIKI KAISHA, Tokyo (JP)

(72) Inventor: Takafumi Nakajima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 33 days.

(21) Appl. No.: 17/148,958

(22) Filed: Jan. 14, 2021

(65) Prior Publication Data

US 2021/0227611 A1 Jul. 22, 2021

(30) Foreign Application Priority Data

Jan. 17, 2020 (JP) ................................. 2020-006221

(51) Int. Cl.
*H04W 76/16* (2018.01)
*H04L 43/0829* (2022.01)
(Continued)

(52) U.S. Cl.
CPC ......... *H04W 76/16* (2018.02); *H04L 43/0835* (2013.01); *H04W 76/25* (2018.02); *H04W 84/042* (2013.01)

(58) Field of Classification Search
CPC ... H04W 76/16; H04W 76/25; H04W 84/042; H04W 36/14; H04W 88/06; H04W 36/16;
(Continued)

(56) References Cited

U.S. PATENT DOCUMENTS 7,200,397 B1 * 4/2007 Jones .................... H04W 48/16
370/332
8,374,158 B2 2/2013 Dostal et al.
(Continued)

FOREIGN PATENT DOCUMENTS

CN 101300861 A 11/2008
CN 107404770 A 11/2017
(Continued)

OTHER PUBLICATIONS

Extended European search report issued in European Appln. No. 20217609.5 dated May 31, 2021.
(Continued)

*Primary Examiner* — Harry H Kim
*Assistant Examiner* — Mohammed M Murshid
(74) *Attorney, Agent, or Firm* — ROSSI, KIMMS & McDOWELL LLP (57) ABSTRACT

A communication apparatus, which has a first communication function for executing communication in a first communication network and a second communication function for executing communication in a second communication network, controls, in a case where the apparatus is in connection with the first communication network, based on a characteristic of the first communication network, a connection to the second communication network in a state in which the connection with the first communication network is maintained.

11 Claims, 7 Drawing Sheets

(51) Int. Cl.
*H04W 76/25* (2018.01)
*H04W 84/04* (2009.01)

(58) Field of Classification Search
CPC ............. H04W 48/18; H04W 36/0066; H04W 36/0069; H04W 36/28; H04L 43/0835; G03B 2206/00
See application file for complete search history.

(56) References Cited

U.S. PATENT DOCUMENTS

| | | | |
|---|---|---|---|
| 10,750,366 B1* | 8/2020 | Gundavelli | H04W 12/069 |
| 2007/0127500 A1* | 6/2007 | Maeng | H04W 12/084 |
| | | | 370/395.52 |
| 2007/0177598 A1* | 8/2007 | Miyazaki | H04L 43/50 |
| | | | 370/392 |
| 2011/0075635 A1* | 3/2011 | Ryu | H04W 36/14 |
| | | | 370/332 |
| 2013/0298194 A1 | 11/2013 | Nakajima | |
| 2014/0003359 A1* | 1/2014 | Williams | H04W 12/03 |
| | | | 370/329 |
| 2014/0247806 A1 | 9/2014 | Fujimoto | |
| 2014/0274179 A1* | 9/2014 | Zhu | H04W 52/243 |
| | | | 455/509 |
| 2015/0029840 A1* | 1/2015 | Kotecha | H04L 47/122 |
| | | | 370/230 |
| 2015/0092764 A1* | 4/2015 | Hirose | H04W 36/14 |
| | | | 370/338 |
| 2015/0230165 A1* | 8/2015 | Aminaka | H04W 48/08 |
| | | | 455/552.1 |
| 2015/0331650 A1 | 11/2015 | Moritomo | |
| 2016/0226861 A1* | 8/2016 | Takae | H04W 48/18 |
| 2016/0323975 A1* | 11/2016 | White | H04M 1/72415 |
| 2017/0325142 A1* | 11/2017 | Lam | H04W 36/0011 |
| 2018/0035284 A1* | 2/2018 | Fujinami | H04W 8/245 |
| 2018/0213447 A1 | 7/2018 | Hiramatsu | |
| 2018/0302370 A1* | 10/2018 | Nakahara | H04L 61/2567 |
| 2019/0274178 A1* | 9/2019 | Salkintzis | H04L 47/125 |
| 2021/0076280 A1* | 3/2021 | Nord | H04W 36/0066 |
| 2021/0195014 A1* | 6/2021 | Mori | H04W 4/20 |

FOREIGN PATENT DOCUMENTS

| | | |
|---|---|---|
| EP | 2947928 A1 | 11/2015 |
| JP | 2014171118 A | 9/2014 |
| JP | 2014175826 A | 9/2014 |

OTHER PUBLICATIONS

3GPP TS 23.501 V16.3.0, 3rd Generation Partnership Project; Technical Specification Group Services and System Aspects; System Architecture for the 5G System (5GS); Stage 2 (Release 16), Dec. 2019, pp. 270-276.

* cited by examiner

COMMUNICATION APPARATUS, CONTROL METHOD, AND NON-TRANSITORY COMPUTER-READABLE STORAGE MEDIUM

BACKGROUND OF THE INVENTION

Field of the Invention

The present invention relates to a wireless connection control technique.

Description of the Related Art

In the 3rd Generation Partnership Project (3GPP), standardization of the 5th Generation (5G) cellular communication system is in progress. In the 5G system, it is assumed that not only the conventional wireless communication carrier deploys the system nationwide but also the local 5G is adopted in which a region or a company locally configures a private system. In general, a conventional communication apparatus capable of executing cellular communication is connected to a cellular communication network deployed by a single contracted wireless communication carrier, like a smartphone for example. On the other hand, if the local 5G is adopted, it is assumed that a communication apparatus is connected not only to the cellular network deployed by the contracted wireless communication carrier but also to a private network configured by the local 5G.

In addition, many of the communication apparatuses capable of executing cellular communication can be connected to a wireless LAN compliant with, for example, the IEEE (Institute of Electrical and Electronics Engineers) 802.11 standard series. If an available wireless LAN exists in the surroundings, the communication apparatus can enjoy a communication service via the wireless LAN by being connected to the wireless LAN while a connection with a cellular communication network or a private network is maintained. US-2014-0247806 describes a wireless LAN connection control method in a communication apparatus that has both a wireless LAN communication function and a cellular network communication function.

The private network can be configured such that communication can be executed only within a certain range such as in a facility or a company and a connection to the external Internet or the like is not allowed. Further, the private network can be configured so as to provide only low-speed communication for, for example, IoT (Internet of Things). In this manner, the private network can have network characteristics different from those of the cellular network as the conventional public wireless network. Note that the communication apparatus can use regional BWA (Broadband Wireless Access) or the like instead of cellular communication, but such a system other than the cellular communication system is also assumed to have characteristics different from those of the public wireless network. However, such differences in characteristics are not considered in connection control of the communication apparatus that can use a plurality of wireless communication systems including the systems as described above and the wireless LAN or the like.

The present invention provides a connection control technique for, in accordance with the characteristic of a network in connection with a communication apparatus, connecting the communication apparatus to another network.

SUMMARY OF THE INVENTION

According to one aspect of the present invention, there is provided a communication apparatus comprising: a first communication unit configured to execute communication in a first communication network; a second communication unit configured to execute communication in a second communication network; and a control unit configured to, in a case where the apparatus is in connection with the first communication network, based on a characteristic of the first communication network, control a connection to the second communication network in a state in which the connection with the first communication network is maintained.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(System Configuration)

Figure 1:
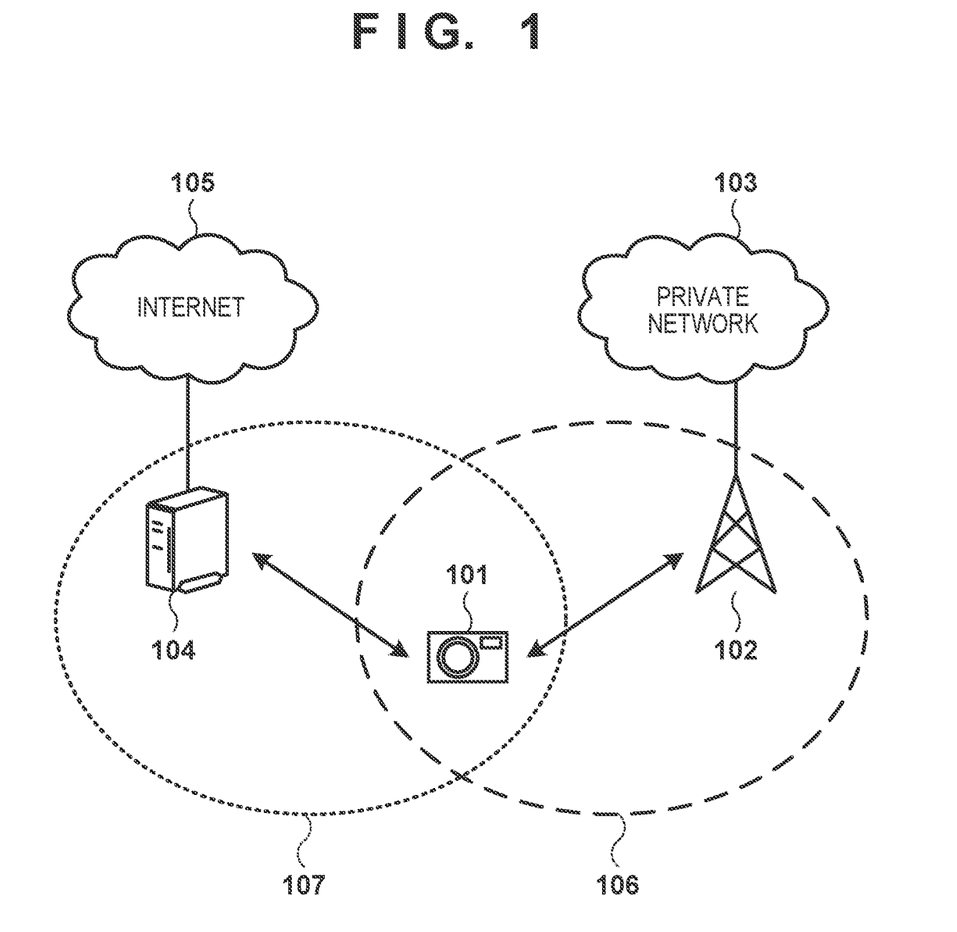
FIG. 1 is a view showing a configuration example of a communication system.

FIG. 1 shows a configuration example of a wireless communication system according to this embodiment. This wireless communication system supports, for example, a cellular communication method such as 5G and a wireless LAN communication method, and is formed to include a digital camera 101 which is a communication apparatus that can be concurrently connected to a network of the cellular communication method and a wireless LAN. Here, LAN is an acronym for Local Area Network. Note that the digital camera 101 is an example of the communication apparatus, and the communication apparatus may be another apparatus, for example, a printer, a FAX machine, a personal computer, a smartphone, a personal digital assistance, or the like.

The wireless communication system also includes a base station 102 of a network of the cellular communication method. The base station 102 is connected to, for example, a private network 103. In this embodiment, the base station 102 and the private network 103 are constructed as a local 5G network. In this case, a communication apparatus compliant with the 5G communication standard can be connected to the base station 102. In one example, the base station 102 is configured to support transmission and reception of radio signals with a plurality of OFDM subcarrier intervals and not to notify a known PLMN ID (Public Land Mobile Network Identifier) (of the telecommunications carrier code defined in ITU-T Recommendation E.212). In this embodiment, the digital camera 101 is compliant with the 5G communication standard. Note that the communication method is not limited to this, and a cellular communication method compliant with the 3GPP standard such as LTE (Long Term Evolution) or the 3rd generation (3G) method may be used.

The private network 103 generally refers to a network that is not a public network, but in this embodiment, the private network 103 is assumed to be a closed network that is not physically/logically connected to the Internet. Further, the private network 103 is assumed to provide a communication service that is available only within the private network 103. Note that, although not shown in FIG. 1, another base station connected to a public network that can be connected to the Internet or the like may exist in the surroundings. The base station connected to the public network is provided by a wireless communication carrier. On the other hand, the base station connected to the private network 103 may be provided by a wireless communication carrier, or may be provided by an individual, a company, or the like that manages the private network 103. Note that the base station 102 and the private network 103 of the cellular communication method are examples, and they may be replaced by, for example, a communication apparatus corresponding to the base station and a network of another method.

The wireless communication system also includes an access point (AP 104) of a wireless LAN. The AP 104 is a wireless LAN access point compliant with, for example, the IEEE802.11 standard series, and can establish a connection with a wireless LAN terminal compliant with the same standard series to execute communication. In this embodiment, it is assumed that the digital camera 101 has a wireless LAN communication function compliant with the IEEE802.11 standard series and is configured such that it can be connected to the AP 104 to execute communication. Here, the AP 104 is connected to, for example, the Internet 105. Note that there may be another AP connected to, for example, the private network as the private network 103 or a different private network.

Note that if a radio wave transmitted from the self-apparatus can reach a terminal with first predetermined power or more and a radio wave transmitted from the terminal can be received with second predetermined power or more, the base station 102 can establish a connection and communicate with the terminal. The range in which such a communicable terminal can exist is shown as a range 106 in FIG. 1. Note that the range 106 can be called a cell. The range in which a terminal that can communicate with the AP 104 can exist is similarly defined, and shown as a range 107 in FIG. 1.

In FIG. 1, it is assumed that the digital camera 101 can concurrently execute communication for accessing the cellular network (private network 103) by being connected to the base station 102, and communication for accessing the Internet 105 by being connected to the AP 104. Note that FIG. 1 is simplified for the sake of descriptive convenience, and there can be a plurality of base stations, a plurality of APs, and a plurality of terminals, of course.

By being connected to the base station 102, the digital camera 101 according to this embodiment can enjoy various kinds of services provided by the private network 103. On the other hand, the private network 103 is not connected to a predetermined connection destination such as the external Internet or the like, so the digital camera 101 cannot be connected to the predetermined connection destination via the base station 102. Therefore, for example, when communicating with an apparatus in the predetermined connection destination such as a server or the like on the Internet, the digital camera 101 is required to be connected to a partner apparatus, other than the base station 102, that can be connected to the predetermined connection destination. That is, in this embodiment, the AP 104 can be connected to the Internet 105, so that the digital camera 101 can communicate with the apparatus in the predetermined connection destination by, for example, being connected to the AP 104. On the other hand, if the digital camera 101 is in connection with a base station of a public network that can be connected to the Internet or the like, it can communicate with the apparatus in the predetermined connection destination without being connected to the AP 104. In this case, since the digital camera 101 is not connected to the AP 104, control can be simplified. In addition, even in such a case, the digital camera 101 can be connected to the AP 104 and execute communication using the AP 104. For example, the digital camera 101 can reduce the load on the public network by, for example, offloading the communication to be executed in the public network to the wireless LAN using the AP 104. Further, the digital camera 101 can improve the throughput by, for example, executing carrier aggregation using the AP 104.

Note that, for example, in order to be provided with a predetermined communication service, the digital camera 101 may be required to have a communication speed equal to or higher than a predetermined level. In this case, the digital camera 101 may not be able to satisfy the demand for communication speed by using the base station 102 alone. In this case, the digital camera 101 can satisfy the demand for communication speed by, in addition to or instead of being connected to the base station 102, being connected to an AP of a wireless LAN and using communication by the wireless LAN. At this time, the digital camera 101 can search for, for example, an AP that can be connected to the private network 103, and the digital camera 101 can be connected to the AP. That is, for example, in order to improve the throughput of communication with a predetermined connection destination in the private network 103, the digital camera 101 can search for an AP that can access the predetermined connection destination, and the digital camera 101 can be connected to the AP.

As has been described above, in the digital camera 101, wireless LAN connection control to be executed may change depending on the base station connected using the cellular communication standard. Note that the above-described mode is an example, and another control may be executed. For example, the digital camera 101 in connection with the base station 102 may be controlled such that it is not allowed to be connected to the AP that can be connected to a network such as the Internet external to the private network 103. That is, wireless LAN connection control may be executed such that no environment is formed in which the private network 103 is connected to an external network such as the Internet via the digital camera 101. Similarly, the digital camera 101 in connection with a base station that can be connected to the Internet or the like can be configured not to be connected to an AP that is connected to the private network 103. Further, when the digital camera 101 is connected to a wireless LAN that can be connected to the Internet or the like, control may be executed so as to disconnect the connection with the base station 102.

An arrangement example of a communication apparatus (digital camera 101) that executes control as described above and an example of the procedure of the process will be described below.

(Apparatus Arrangement)

Figure 2:
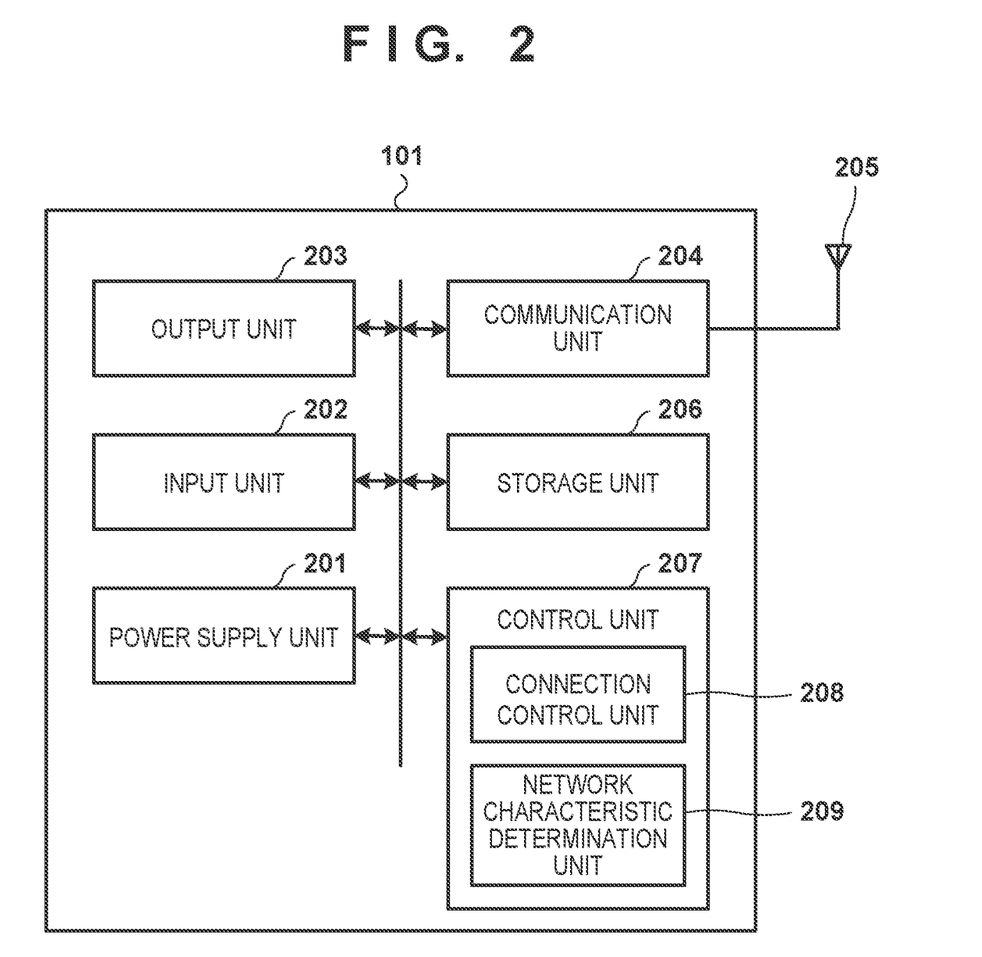
FIG. 2 is a block diagram showing an arrangement example of a digital camera.

FIG. 2 shows an arrangement example of the digital camera 101. The digital camera 101 includes, as one example, a power supply unit 201, an input unit 202, an output unit 203, a communication unit 204, an antenna 205, a storage unit 206, and a control unit 207. The power supply unit 201 is formed to include a power supply that supplies power to each hardware. The power supply unit 201 obtains electric power from, for example, an AC power supply or a battery, and supplies the obtained electric power to other functional units. The input unit 202 is formed to include a keyboard, buttons, or the like for performing various kinds of inputs or the like by a user, and accepts a user operation for operating the digital camera 101. The output unit 203 is formed to include a device, such as an LCD (Liquid Crystal Display) for performing various kinds of display modes, an LED (Light Emitting Diode) capable of outputting information that can be visually recognized, or a loudspeaker capable of audio output. Note that the output unit 203 can have a function of outputting at least either of visual information and audio information, but instead of or in addition to this, the output unit 203 may have another information output function such as a function of outputting information by vibration. Note that both of the function of the input unit 202 and the function of the output unit 203 may be implemented by one module by a touch panel or the like.

The communication unit 204 is used when executing cellular communication such as LTE (Long Term Evolution) compliant with the 3GPP standard or 5G, and wireless LAN communication compliant with, for example, the IEEE802.11 standard series. The communication unit 204 includes a wireless interface (wireless I/F) for cellular communication and a wireless I/F for wireless LAN, and each wireless I/F is formed to include, for example, a radio chip such as an RF (radio frequency) circuit or a baseband circuit. The communication unit 204 outputs a radio signal generated using the radio chip or the like to the antenna 205 to send the radio signal to the outside via the antenna 205. Further, the communication unit 204 can receive a radio signal from the outside via the antenna 205, analyze the radio signal using the radio chip or the like, and obtain data included in the radio signal. The antenna 205 is an antenna corresponding to each wireless I/F of the communication unit 204. The antenna 205 may be, for example, a multiband antenna that supports both of the frequency band of the wireless LAN and the frequency band of the cellular communication, or may include separate antennas that support these frequency bands, respectively.

The storage unit 206 is formed to include a storage medium configured to store a control program to be executed by the control unit 207 and various kinds of information such as communication parameters and captured image data. For example, the storage unit 206 is formed to include a memory such as a ROM (Read Only Memory) or a RAM (Random Access Memory). Various kinds of operations to be described later are implemented when the control unit 207 executes the control program stored in the storage unit 206. Note that the storage unit 206 may be formed to include, other than the memory such as a ROM or a RAM, a storage medium such as a flexible disk, a hard disk, an optical disk, a magnetooptical disk, a CD-ROM, a CD-R, a magnetic tape, a non-volatile memory card, or a DVD. Further, the storage unit 206 may be formed to include storage media such as a plurality of memories. The storage unit 206 may store and hold the subscriber information of the cellular network or the like, and may store, for example, the information of a SIM (Subscriber Identity Module) card.

The control unit 207 controls the entire apparatus by executing the control program stored in the storage unit 206. The control unit 207 is formed by, for example, one or more processors such as a CPU or an MPU. Note that the control unit 207 may control the entire digital camera 101 by cooperation of the programs stored in the storage unit 206 and an OS (Operating System). In this embodiment, the control unit 207 can operate as a network characteristic determination unit 209 and a connection control unit 208 by executing the control program stored in the storage unit 206. The network characteristic determination unit 209 determines the characteristic of the cellular network to which the digital camera 101 has connected. The network characteristic can be, for example, the characteristic as to whether the cellular network in connection with the digital camera 101 is a private network, the characteristic as to the communication speed, or the like. Note that the characteristic other than these characteristics may be used. Based on the information determined by the network characteristic determination unit 209, the connection control unit 208 executes cellular communication and connection control to the wireless LAN.

(Procedure of Process)

Figure 3:
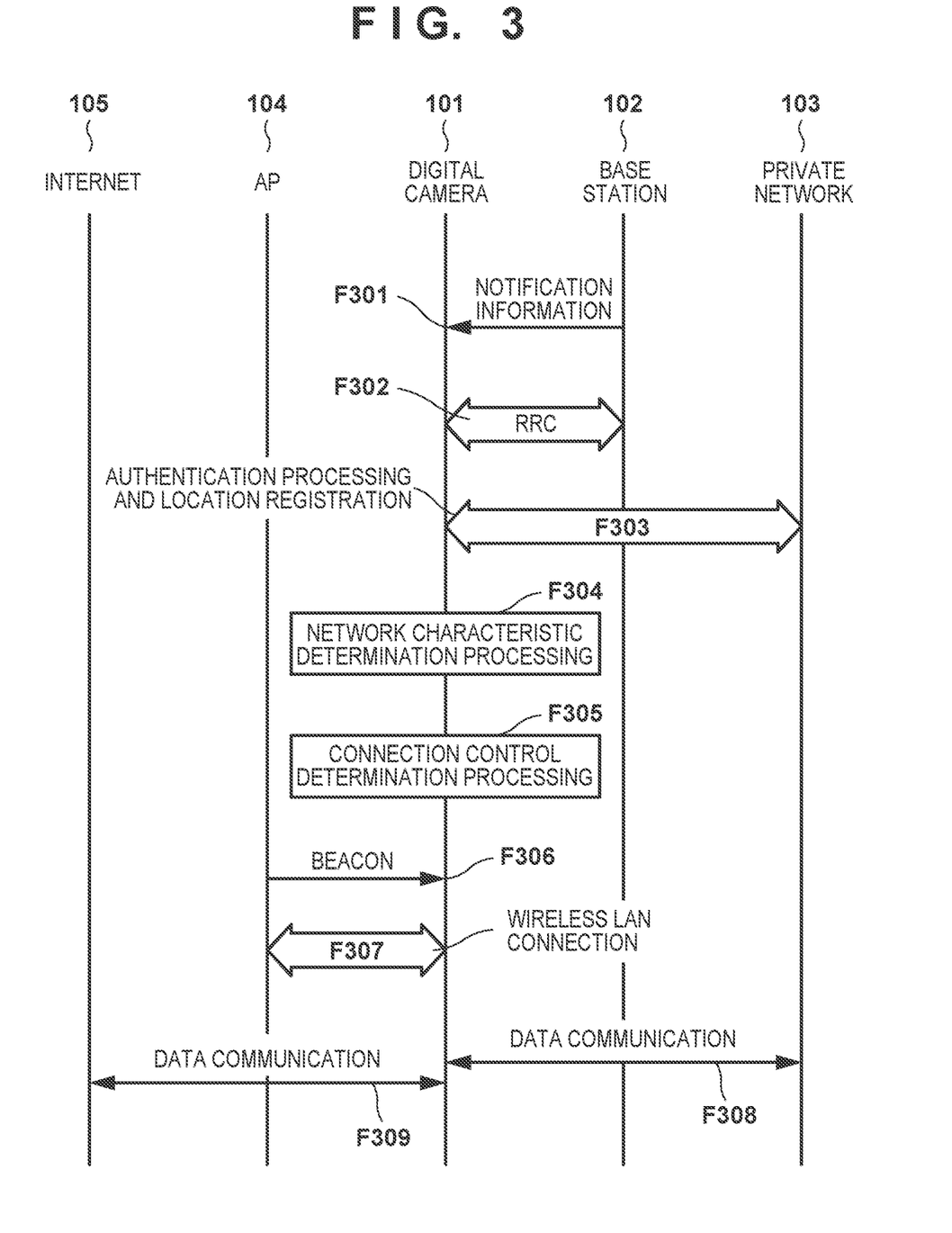
FIG. 3 is a sequence chart showing an example of the procedure of communication in the communication system.

Next, an example of the procedure of communication according to this embodiment will be described with reference to FIG. 3. In this embodiment, a case will be described in which after the digital camera 101 is connected to the private network 103 via the base station 102, it is determined whether to connect the digital camera 101 to the AP 104 of the wireless LAN. Note that in the example shown in FIG. 3, it is assumed that the digital camera 101 is not in connection with the base station 102 in the initial state. After installation by, for example, the administrator of the private network 103, the base station 102 periodically broadcasts notification signals such as Master Information Block and System Information Block (F301). When the digital camera 101 enters the cell (range 106) deployed by the base station 102, it can receive the notification signal and obtain information related to the base station 102.

Then, the digital camera 101 starts processing for connecting to the cellular network. For example, if the digital camera 101 has accepted a user operation instructing to execute a predetermined communication service provided by the private network 103, the digital camera 101 starts the processing for connecting to the cellular network to make a transition from a standby state to a connected state. Note that the digital camera 101 may start the connection processing if identification information (for example, a PLMN ID) included in the notification signal sent from the base station 102 is a predetermined value. The PLMN ID is identification information formed by a country code called MCC (Mobile Country Code) and a business code called MNC (Mobile Network Code). For example, when the digital camera 101 enters from the range of the cell of the 5G base station of a public network to the range of the cell of the base station of a local 5G, it makes a transition to the connected state for tracking area update, but it may maintain the connected state thereafter. In the connection processing, the digital camera 101 executes connection processing in various layers including, for example, an RRC (Radio Resource Control) layer (F302). Note that, for example, an RRC message transmitted/received in F302 or the notification signal in F301 may notify the digital camera 101 of information indicating that the base station 102 is a base station related to a closed network and it cannot be connected to the Internet.

After an RRC connection with the base station 102 is established, the digital camera 101 executes authentication processing and location registration processing with the private network 103 via the base station 102 (F303). Here, in the authentication processing, for example, authentication is executed based on the subscriber information for connection to the private network 103. The subscriber information is, for example, the IMSI (International Mobile Subscriber Identity) or the like. In the location registration processing, the registration processing for managing, on the private network 103 side, the location information of the communication apparatus (digital camera 101) to be connected to the private network 103 is executed. Note that in this embodiment, the information for connection to the base station 102, the subscriber information required for the authentication processing for connection to the private network 103, and the like are stored in advance in the storage unit 206 of the digital camera 101, but the present invention is not limited to this. For example, the digital camera 101 may use a function of the embedded SIM such as eSIM (embedded SIM) to obtain the subscriber information upon being connected to the private network 103, and write it in the storage unit 206.

After the connection with the private network 103 is established, the digital camera 101 executes network characteristic determination processing (F304). In the network characteristic determination processing, the network characteristic of the connected cellular network (the private network 103 in this embodiment) is determined. The characteristic can be, for example, a characteristic as to whether the cellular network is a private network or a public network. Whether the cellular network is a private network or a public network can be determined based on, for example, an APN (Access Point Name) used upon connection to the cellular network, or the PLMN ID. For example, the digital camera 101 can store the PLMN IDs of respective carriers in the storage unit 206, and if the PLMN ID of the connection destination has not been stored, it can determine that the cellular network of the connection destination is a private network. It can also be said that the characteristic is a characteristic as to whether the cellular network can be connected to a predetermined connection destination such as the Internet.

Further, by being temporarily connected to a connectable wireless LAN AP in the surroundings and based on whether the digital camera 101 can access, via the wireless LAN, the base station connected in the cellular network or the cellular communication function of the self-apparatus, the digital camera 101 can determine whether the cellular network is a private network. Note that in this case, the digital camera 101 selectively uses, among connectable wireless LAN APs in the surroundings, an AP that can be connected to the Internet. If the access is successful, the cellular network is determined to be a public network because the cellular network is accessible via the Internet. On the other hand, if the access fails, the cellular network is determined to be a private network because the cellular network is not accessible via the Internet.

This determination may be executed such that if the cellular network is a local 5G network, it is determined to be a private network, and if the cellular network is not a local 5G network, it is determined to be a public network. Whether the cellular network is a local 5G network can be notified to the digital camera 101 by the notification signal or the RRC message transmitted from the base station 102. Alternatively, whether the cellular network is a local 5G network may be determined using the APN or the PLMN ID. For example, the digital camera 101 can store the APN and PLMN ID of the local 5G in the storage unit 206 in advance and, based on whether these pieces of information of the connected cellular network have been stored, it can determine whether the cellular network is a local 5G network. Alternatively, the digital camera 101 may determine whether the cellular network is a local 5G network from the subscriber information.

After the network characteristic determination processing, the digital camera 101 executes connection control determination processing (F305). In the connection control determination processing, it is determined, based on the result of the network characteristic determination processing, whether the digital camera 101 is required to be connected to a network different from the connected cellular network. In this embodiment, the control determination processing is executed to determine whether the digital camera 101 is required to be connected to the Internet using a wireless LAN. The details of the control determination processing will be described later. In this embodiment, assume that a connection to the Internet using a wireless LAN has been determined to be required. In accordance with this determination result, the digital camera 101 executes processing of searching for a wireless LAN in the surroundings to establish a wireless LAN connection. For example, by receiving a beacon transmitted by the AP 104 in the surroundings (F306), the digital camera 101 can detect the wireless LAN constructed by the AP 104. Note that the digital camera 101 may detect a wireless LAN by, for example, transmitting a probe request to search for a predetermined AP and receiving a probe response as a response.

Thereafter, the digital camera 101 establishes a wireless LAN connection with the detected AP 104 (F307). Note that the digital camera 101 can hold communication parameters such as an SSID (Service Set Identity) and an encryption key for establishing a wireless LAN connection with the AP 104 in the storage unit 206 in advance. However, the present invention is not limited to this, and communication parameters may be obtained using a communication parameter setting protocol such as the WPS (Wi-Fi Protected Setup) or the DPP (Device Provisioning Protocol). Then, after the wireless LAN connection with the AP 104 is established, the digital camera 101 executes data communication with the private network 103 using the cellular communication (F308), and also executes data communication with the Internet 105 via the wireless LAN (F309).

Figure 4:
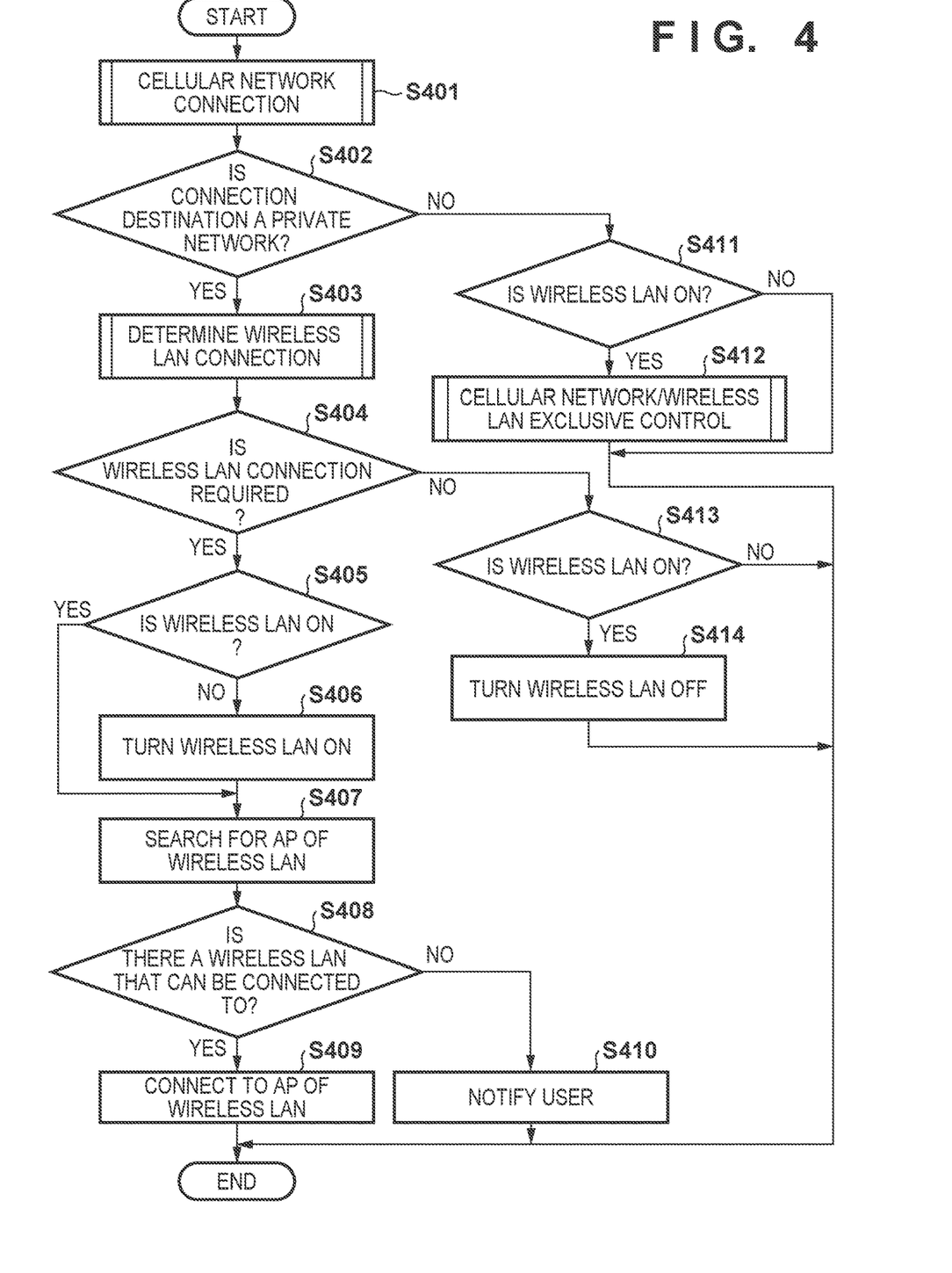
FIG. 4 is a flowchart illustrating an example of the procedure of process executed by the digital camera.

Next, with reference to FIG. 4, the procedure of the process executed by the digital camera 101 will be described. Note that this process is implemented by, for example, the control unit 207 of the digital camera 101 executing the control program stored in the storage unit 206 and operating as the network characteristic determination unit 209 and the connection control unit 208. However, the present invention is not limited to this, and part or all of the process to be described below may be executed by dedicated hardware.

First, the digital camera 101 executes connection processing in the cellular network (step S401). As has been described above, the digital camera 101 receives notification information sent from the base station 102, executes connection processing in respective layers including the RRC layer, and executes the authentication processing and the location registration processing, thereby establishing a connection with the private network 103. Then, the digital camera 101 determines whether the cellular network of the connection destination is a private network (step S402). For example, as has been described above, the digital camera 101 executes the processing of determining whether the network of the connection destination is a public network and, if it is not a public network, determines that it is a private network. Alternatively, the digital camera 101 may store the identification information of the private network in the storage unit 206 and, if the identification information of the cellular network of the connection destination matches the identification information of the private network, determine that the cellular network of the connection destination is the private network. The identification information can be, for example, the PLMN ID. However, this is an example, and the determination may be executed based on another information such as APN information. Further, the digital camera 101 may add, to the IMSI type, information as to whether the IMSI is for private network, and store it. The determination may be executed based on whether the IMIS for private network is used. Here, it is only required to determine whether the cellular network of the connection destination is a private network, and the present invention is not limited to these determination methods. Further, the determination can be executed based on whether the cellular network of the connection destination can access a predetermined connection destination such as the Internet. For example, if the cellular network can access the predetermined connection destination, it can be handled as in a case in which it is determined not to be a private network, and if the cellular network cannot access the predetermined connection destination, it can be handled as in a case in which it is determined to be a private network. If the cellular network of the connection destination is determined to be a private network (YES in step S402), the digital camera 101 advances the process to step S403.

In step S403, the digital camera 101 executes the wireless LAN connection determination processing. An example of the procedure of this processing will be described with reference to FIG. 5. Note that this processing is implemented by, for example, the control unit 207 of the digital camera 101 executing the control program stored in the storage unit 206 and operating as the connection control unit 208. However, the present invention is not limited to this, and part or all of the processing to be described below may be executed by dedicated hardware.

Figure 5:
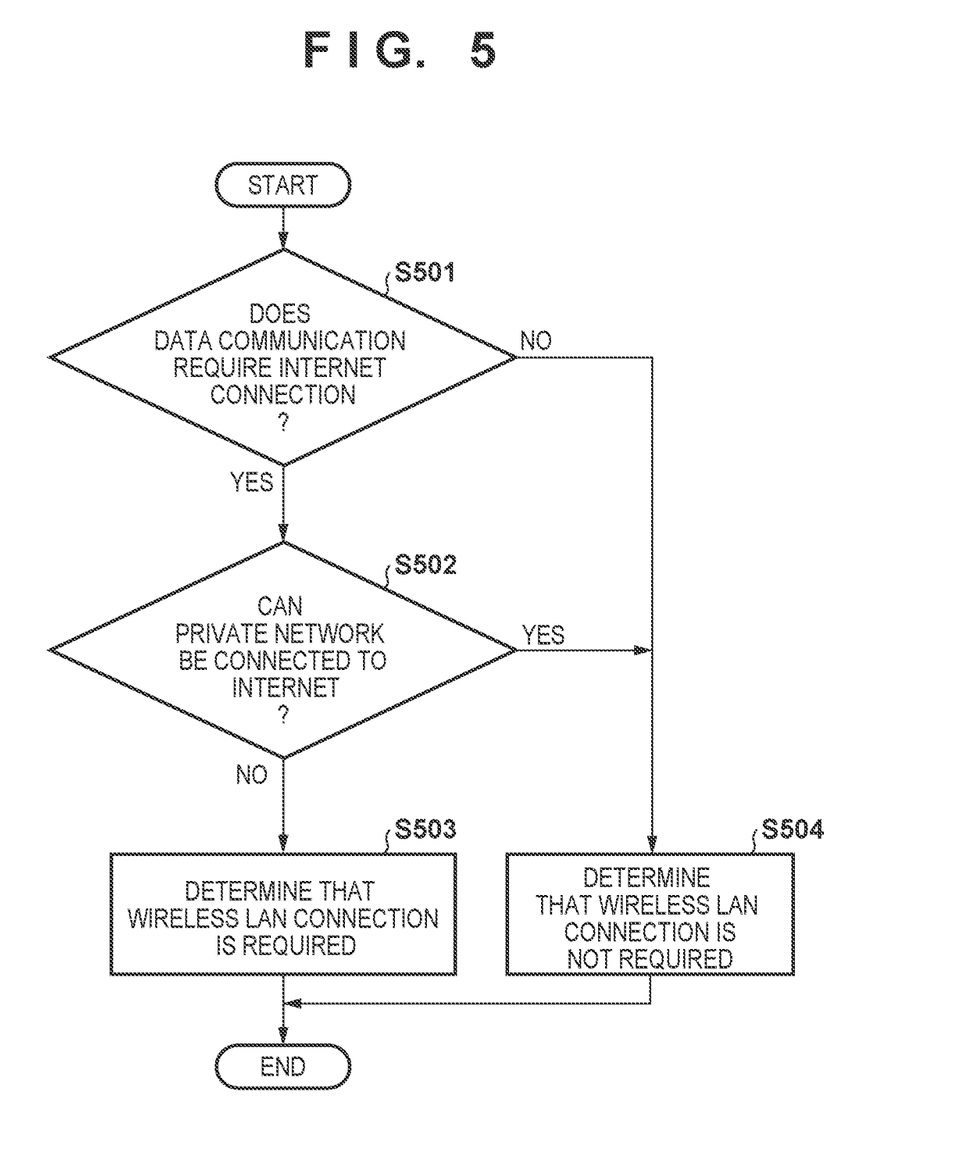
FIG. 5 is a flowchart illustrating a first example of the procedure of wireless LAN connection determination processing.

First, the digital camera 101 determines whether the data communication to be executed includes data communication that requires an Internet connection (step S501). For example, e-mail transmission/reception or the like is determined to be data communication that requires an Internet connection. Further, other types of data communication in which transmission and reception are executed via the Internet, such as Web access via the Internet and communication by an application that requires an Internet connection, can also be determined to be data communication that requires an Internet connection. Based on whether an application or a program that involves execution of target data communication is active, the digital camera 101 can determine whether such data communication is required. Further, based on the information (for example, the address or the URL) indicating the communication partner apparatus upon starting the data communication, the digital camera 101 may determine whether an Internet connection is required. If it is determined that data communication that requires an Internet connection is being executed or to be executed (YES in step S501), the digital camera 101 advances the processing to step S502. On the other hand, if it is determined that data communication that requires an Internet connection is not executed (NO in step S501), the digital camera 101 determines that a wireless LAN connection is not required (step S504), and terminates the processing.

In step S502, the digital camera 101 determines whether the private network of the connection destination can be connected to the Internet. For example, based on the determination information of the network characteristic determination unit 209, the digital camera 101 determines whether the private network can be connected to the Internet. In this embodiment, the digital camera 101 executes the determination based on the information as to whether the characteristic of the private network 103 allows an Internet connection. Whether the private network 103 can be connected to the Internet may be determined based on, for example, whether the digital camera 101 can access, via the private network 103, a typical server that can be connected via the Internet. Further, the digital camera 101 may receive, from the base station 102 or from the private network 103 via the base station 102, information as to whether the private network 103 can be connected to the Internet, and execute the determination based on the information. Note that these determination methods are examples, and the present invention is not limited to them. If it is determined that the private network 103 cannot be connected to the Internet (NO in step S502), the digital camera 101 determines that it requires to be further connected to a wireless LAN in a state in which it is connected to the private network 103 (step S503), and terminates the processing. On the other hand, if it is determined that the private network 103 can be connected to the Internet (YES in step S502), the digital camera 101 determines that a wireless LAN connection is not required (step S504), and terminates the processing.

Referring back to FIG. 4, if it is determined that a wireless LAN connection is not required (NO in step S404) and if the wireless LAN function of the self-apparatus is ON (YES in step S413), the digital camera 101 turns off the wireless LAN function (step S414), and terminates the process. For example, the digital camera 101 deactivates (turns off) the wireless LAN function by stopping the wireless LAN I/F. The digital camera 101 may deactivate the wireless LAN function by controlling the wireless LAN I/F so as not to transmit wireless LAN radio waves while maintaining it in an activated state. Further, the digital camera 101 may control the wireless LAN I/F so as not to transmit a radio frame related to AP connection processing, such as Scan or Association Request of the wireless LAN. In this case, the digital camera 101 may not stop transmission/reception of, for example, a wireless LAN frame related to Wi-Fi Direct or the like for direct communication with another communication apparatus. Here, the digital camera 101 need only prevent execution of processing related to a connection to the AP, and such control is called deactivation of the wireless LAN function. Further, if the wireless LAN function is deactivated, the digital camera 101 may notify, via display on the output unit 203 or the like, the user of the deactivation of the wireless LAN function. According to the processing as described above, the digital camera 101 can prioritize the connection with the private network and suppress switching of the connection to the wireless LAN. Therefore, if the digital camera 101 can execute control so as to maintain the connection with the private network, it may not deactivate the wireless LAN function. Note that the digital camera 101 can stop the power supply to the wireless LAN function to deactivate the wireless LAN function, and in this case, the power consumption can be suppressed.

On the other hand, if it is determined that a wireless LAN connection is required (YES in step S404) and if the wireless LAN function of the self-apparatus is not ON (NO in step S405), the digital camera 101 turns on the wireless LAN function (step S406). Here, a state in which the wireless LAN function is ON indicates, for example, a state in which the wireless LAN I/F is activated and can transmit and receive wireless LAN radio waves. That is, the digital camera 101 makes a transition to a state in which a wireless LAN connection can be established. Note that before executing the processing in step S405, the digital camera 101 may notify the user, via display on the output unit 203 or the like, that wireless LAN connection establishment processing is started. Further, before executing the processing in step S405, the digital camera 101 may display an option as to whether to start the wireless LAN connection establishment processing using the wireless LAN function, and accept a user selection as to whether to start the processing. In this case, if a user operation indicating to start the wireless LAN connection establishment processing is accepted, the process from step S405 is executed. If a user selection indicating not to start the wireless LAN connection establishment processing is accepted, the process illustrated in FIG. 4 may be terminated. Further, in step S406, the digital camera 101 may notify the user, via display on the output unit 203 or the like, that the wireless LAN function has been activated.

Then, the digital camera 101 executes processing of searching for a wireless LAN AP existing in the surroundings (step S407). The AP search processing can be executed by, for example, receiving a beacon transmitted by an AP in the surroundings. Further, the digital camera 101 may detect the AP by transmitting a probe request and receiving a probe response as a response from the AP in the surroundings. If an AP to which the self-apparatus can be connected is found in the surroundings (YES in step S408), the digital camera 101 executes processing for connecting to the AP (step S409), and terminates the process. On the other hand, if no AP to which the self-apparatus can be connected is found in the surroundings (NO in step S408), the digital camera 101 notifies the user, for example, via display on the output unit 203 or the like, that no AP has been found (step S410), and terminates the process. Note that whether a connectable AP exists can be determined by comparison between information of the connectable AP stored in the storage unit 206 and the search result. For example, if the network identifier such as the SSID or the BSSID of the AP found by the search has been stored in the storage unit 206, the digital camera 101 determines that the connectable AP exists. Further, the digital camera 101 may output a list of APs in the searched surroundings to the output unit 203, and prompt the user to select the AP of the connection destination. Then, the digital camera 101 obtains, using the WPS or the DPP, communication parameters such as an encryption key required for the connection. Further, the digital camera 101 may accept, for example, a manual input of an encryption key or a passphrase by the user to check whether it can be connected to the AP of the connection destination. Note that if the wireless LAN connection processing is failed, the digital camera 101 may determine that there is no connectable wireless LAN AP, or may execute the AP detection processing (in some cases, acceptance of a user selection of the AP of the connection destination) again.

In the wireless LAN connection processing in step S409, the digital camera 101 is connected to the AP using, for example, the communication parameters such as the SSID and the encryption key stored in the storage unit 206. Note that if the connection to the AP is failed, the user can be notified of the connection failure using display on the output unit 203 or the like. However, the present invention is not limited to this, and if another connectable AP candidate exists, connection establishment processing with the other AP may be executed. In this case, if connections to the candidate APs are all failed, the user is notified of the connection failure via display on the output unit 203 or the like. Note that after the connection with the wireless LAN AP is established, if it is found that the network address of the IP (Internet Protocol) address of the connected wireless LAN and that of the private network are identical, processing to be described below may be executed. That is, each of the IP address in the private network and the IP address on the wireless LAN network side is assigned from the network by a function such as the DHCP (Dynamic Host Configuration Protocol) or the like. At this time, if the network addresses of the IP addresses to be used are identical, it is necessary to identify each of the cellular network U/F and the wireless LAN I/F to transmit and receive target IP packets. In this case, if the digital camera 101 can transmit and receive IP packets while distinguishing the I/Fs from each other, it can execute data communication in the both networks. On the other hand, if the digital camera 101 cannot distinguish IP packets transmitted/received using the respective I/Fs, it cannot execute normal data communication. In such a case, the digital camera 101 searches for another connectable wireless LAN in the surroundings and, if another connectable wireless LAN is detected, the digital camera 101 may be disconnected from the connected wireless LAN and connected to the detected other wireless LAN. In this case, the digital camera 101 may repeat the disconnection and connection processing of the wireless LAN until the network address of the wireless LAN becomes different from that of the private network. If the digital camera 101 cannot detect another connectable wireless LAN, it may notify the user of an error (for example, including the detection result) via display on the output unit 203 or the like, and terminate the process illustrated in FIG. 4.

If it is determined in step S402 that the cellular network of the connection destination is not a private network (NO in step S402), the digital camera 101 determines whether the wireless LAN function is active (ON) (step S411). If the wireless LAN function is inactive (NO in step S411), the digital camera 101 directly terminates the process illustrated in FIG. 4. On the other hand, if the wireless LAN function is active (YES in step S411), the digital camera 101 executes exclusive control processing between the cellular network and the wireless LAN (step S412), and terminates the process illustrated in FIG. 4. The details of the exclusive control processing will be described with reference to FIG. 6. Note that this processing is implemented by, for example, the control unit 207 of the digital camera 101 executing the control program stored in the storage unit 206 and operating as the connection control unit 208. However, the present invention is not limited to this, and part or all of the processing described below may be executed by dedicated hardware. Note that at the time of starting this processing, the digital camera 101 is connected to a public network.

Figure 6:
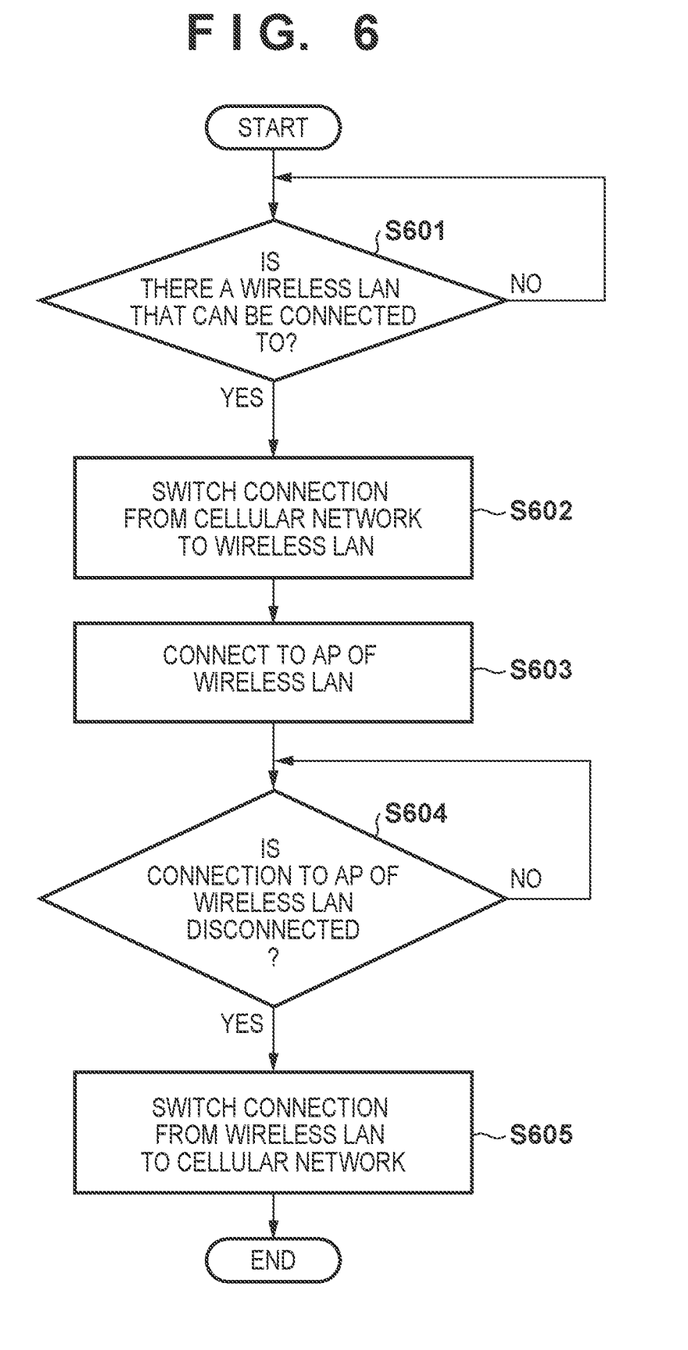
FIG. 6 is a flowchart illustrating an example of the procedure of exclusive control between a cellular network and a wireless LAN.

First, the digital camera 101 repeatedly searches for a connectable wireless LAN AP existing in the surroundings until such an AP is detected (step S601). Note that if a connectable wireless LAN AP is detected in the surroundings (YES in step S601), the digital camera 101 switches the connection from the cellular network (public network) to the wireless LAN (step S602). Here, the digital camera 101 disconnects the communication link for data communication with the public network. That is, while no connectable wireless LAN AP is detected, communication is executed using the cellular network, and if a connectable wireless LAN AP is detected, the cellular communication is disconnected to execute communication using the wireless LAN. Then, the digital camera 101 executes processing for connecting to the wireless LAN AP (step S603). Note that an example is illustrated here in which the processing for connecting to the AP is executed after the cellular network is disconnected, but the cellular network may be disconnected after the connection with the AP is established. That is, the cellular network may be disconnected after the digital camera 101 is set in a state in which it can execute data communication using the wireless LAN. The connection processing between the digital camera 101 and the AP is as described above, so a description thereof is not repeated here. After the connection with the AP is established, the digital camera 101 executes data communication via the AP. During the data communication, the digital camera 101 repeatedly determines whether it is disconnected from the AP (step S604). If the digital camera 101 is disconnected from the AP (YES in step S604), it switches the connection destination from the wireless LAN to the cellular network (step S605). The digital camera 101 is reconnected to the cellular network and establishes a communication link. That is, while being connected to the AP, the digital camera 101 executes communication using the wireless LAN, and after it is disconnected from the AP, it executes communication using the cellular network. Note that in a case in which, for example, the frame error rate or the like exceeds a predetermined value before the digital camera 101 is disconnected from the AP, the digital camera 101 may reestablish the connection with the cellular network in preparation for disconnection from the AP. If the connection with the cellular network has been reestablished, the digital camera 101 terminates the processing illustrated in FIG. 6. Note that in this case, the digital camera 101 may execute the processing from step S601 illustrated in FIG. 6 again. The digital camera 101 may repeatedly execute the processing illustrated in FIG. 6 until it is instructed to stop the processing as illustrated in FIG. 6 by, for example, a user operation.

As has been described above, the digital camera 101 executes the processing for using either of the cellular network and the wireless LAN. Note that this is an example, and the digital camera 101 may concurrently use the cellular network and the wireless LAN, for example. Further, the digital camera 101 may maintain the communication link with the cellular network and that with the wireless LAN, and switch the communication link used for the data communication by internal switching or the like.

As has been described above, in this embodiment, the digital camera 101 controls the wireless LAN connection in accordance with the network characteristic of the connected cellular network. With this operation, for example, in a state in which the digital camera 101 is connected to a private network that is not connected to the Internet, the digital camera 101 can execute communication similar to conventional communication in a public network that is connected to the Internet. In this embodiment, a case has been described in which, if an Internet connection is required, the digital camera 101 connected to the private network 103 is connected to a wireless LAN that can be connected to the Internet. However, the present invention is not limited to this. For example, the digital camera 101 connected to the private network 103 may be allowed to be connected to only a wireless LAN that can be connected to the private network 103 alone. That is, for the digital camera 101, the wireless LAN as a connection destination candidate may be restricted in accordance with the characteristic of the cellular network of the connection destination. In this case, it becomes possible to prevent the digital camera 101 from being concurrently connected to an internal network and an external network. In addition to the above-described control operations, the digital camera 101 can execute network connection control based on various policies by executing wireless LAN connection control based on the characteristic of the cellular network of the connection destination.

Note that in the embodiment described above, a case has been described in which the digital camera 101 executes the wireless LAN connection control based on the characteristic of the cellular network of the connection destination. However, the present invention is not limited to this. For example, when the digital camera 101 is connected to a first network, it can execute connection control to another second network based on the characteristic such as whether the digital camera 101 can access a predetermined connection destination via the first network. With this operation, for example, in a state in which a connection with the wireless LAN is established, the digital camera 101 may execute connection control to the cellular network in accordance with the characteristic of the wireless LAN. For example, if the digital camera 101 becomes a state in which it is necessary to be connected to the Internet while it is connected to an AP connected to the private network 103, control may be executed so as to connect the digital camera 101 to a cellular base station connected to a public network.

Further, in the embodiment described above, a case has been described in which the connection destination accessible via the network is used as the characteristic of the network. However, the present invention is not limited to this. For example, the characteristic of the network may be the communication speed with the network. An example of the procedure of the processing in this case will be described with reference to FIG. 7.

Figure 7:
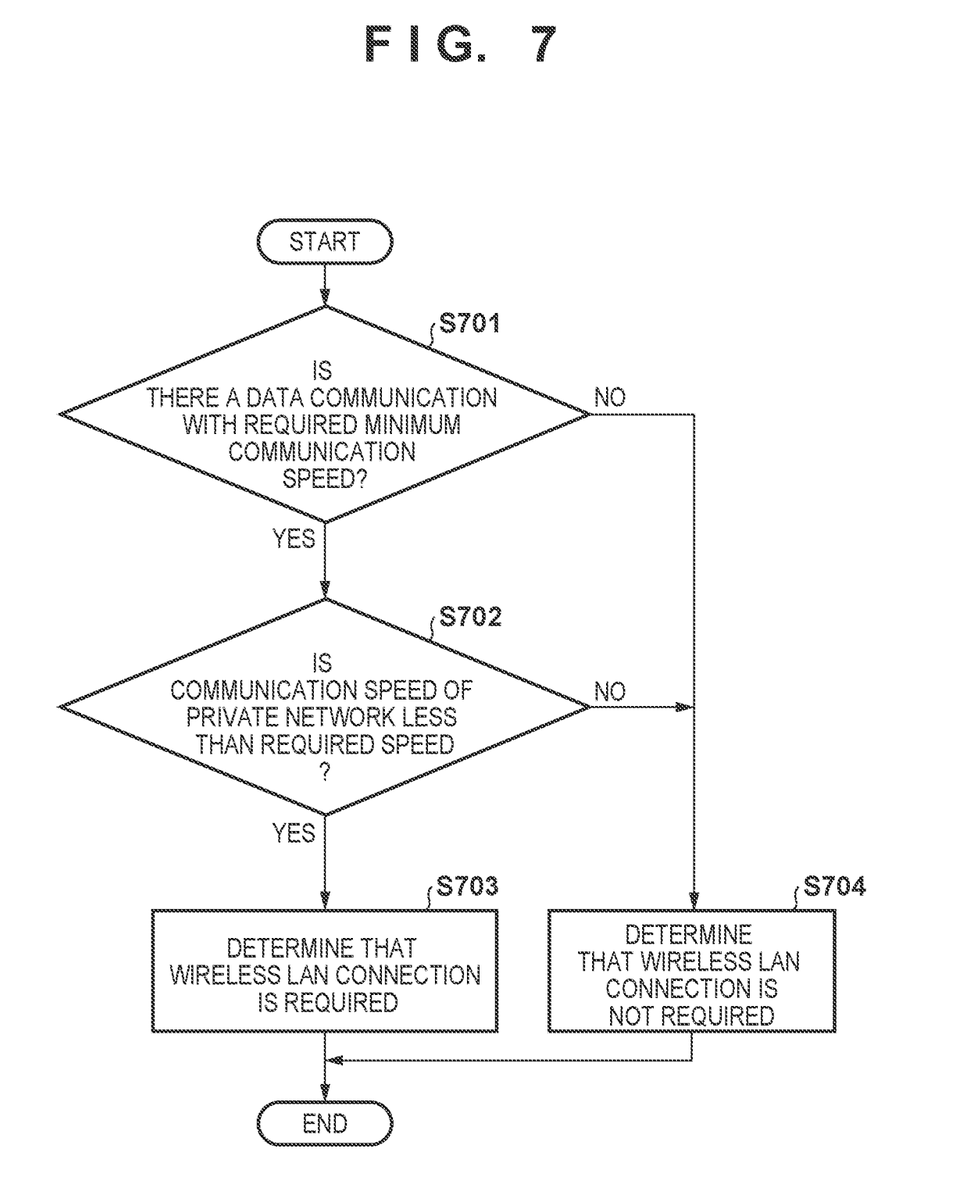
FIG. 7 is a flowchart illustrating a second example of the procedure of the wireless LAN connection determination processing.

In this processing, the digital camera 101 first determines whether the data communication to be executed includes data communication that requires a minimum communication speed (step S701). That is, it is determined whether one or more pieces of data communication to be executed by the digital camera 101 include data communication in which the lower limit value of the communication speed is set. For example, if the digital camera 101 is executing a streaming application that requires high-speed communication and the lower limit of the communication speed for stably executing streaming is defined, it is determined that there is data communication that requires a minimum communication speed. Note that, in this manner, whether the data communication requires a minimum communication speed may be determined based on the application to be executed, or may be determined based on whether a required minimum communication speed is defined in, for example, the control signal or the like at the time of data communication.

If the data communication to be executed includes data communication that requires a minimum communication speed (YES in step S701), the digital camera 101 determines whether the communication speed of the private network 103 is lower than the required minimum communication speed (step S702). The digital camera 101 can execute the determination by, for example, actually executing data communication via the private network 103 to measure the communication speed, and comparing the measurement result and the required minimum communication speed.

Further, the digital camera 101 may execute the determination based on information related to the communication speed that can be obtained from the base station 102 or the private network 103. A method other than the methods described above may be used to execute the determination in step S702.

If it is determined that the communication speed of the private network 103 is lower than the required minimum communication speed (YES in step S702), the digital camera 101 determines that it needs to be further connected to a wireless LAN while it is connected to the private network 103 (step S703), and terminates the processing illustrated in FIG. 7. If there is no data communication having a constraint of the required minimum communication speed (NO in step S701), or if it is determined that the communication speed of the private network 103 is equal to or higher than the required minimum communication speed (NO in step S702), the digital camera 101 determines that a wireless LAN connection is not required (step S704).

Note that if it is determined, based on the required minimum communication speed of the data communication related to a service that can be executed via the private network 103, that a wireless LAN connection is required, the digital camera 101 is connected to the AP of the wireless LAN that can be connected to the private network 103. This is because if the digital camera 101 is connected to the AP of the wireless LAN that cannot access the private network 103, a communication speed sufficient for a service provided by the private network 103 cannot be obtained between the digital camera 101 and the private network 103. Thus, if it determined in step S703 that a wireless LAN connection is required, the digital camera 101 needs to search for and be connected to an AP that can communicate with the partner apparatus of the data communication which cannot satisfy the required minimum communication speed.

As has been described above, the digital camera 101 can determine, based on the communication speed of the cellular network and the require communication speed of the data communication to be executed by the self-apparatus, whether to establish a wireless LAN connection. Note that the communication speed is an example of the communication quality. For example, the digital camera 101 may determine, based on whether the packet loss rate of the cellular network is equal to or lower than a predetermined value, whether to establish a wireless LAN connection. For example, if the packet loss rate of the cellular network is equal to or lower than the predetermined value, the digital camera 101 can determine that the reliability of the cellular network is sufficient, and determine that a wireless LAN connection is not required. On the other hand, if the packet loss rate of the cellular network is higher than the predetermined value, the digital camera 101 can determine that the reliability of the cellular network is insufficient, and determine that a wireless LAN connection is required. That is, if an arbitrary communication quality satisfies a predetermined criterion, it can be determined that a wireless LAN connection is not required, and if the communication quality does not satisfy the predetermined criterion, it can be determined that a wireless LAN connection is required.

Note that the network characteristics used for wireless LAN connection determination are not limited to them. For example, the necessity of a wireless LAN connection may be determined based on a frequency band used for a connection to the private network. For example, the millimeter wave band can be used in 5G, but a millimeter wave has high straightness, so that it is assumed that communication may be interrupted if there is a shielding object. Therefore, if the frequency band used in the private network is the millimeter wave band, the digital camera 101 may determine that a wireless LAN connection is required. According to this, the digital camera 101 can establish a wireless LAN connection and concurrently use the cellular network and the wireless LAN. If the communication using the millimeter wave band in the cellular network is interrupted, the digital camera 101 can complement the data communication with the wireless LAN communication. This is an example, and if the frequency band used for the communication in the cellular network is a predetermined frequency band (for example, a frequency band higher than a predetermined frequency) other than the millimeter wave band, control can be executed so as to establish a wireless LAN connection. Further, if a frequency band other than the predetermined frequency band is used, control can be executed so as not to establish a wireless LAN connection.

Further, the digital camera 101 may execute the wireless LAN connection determination based on whether it needs to obtain the location information (of the self-apparatus). The digital camera 101 can execute the determination based on, for example, whether it is executing an application or a program that requires obtainment of location information. The location information is, for example, latitude/longitude information. In general, in a cellular network, a terminal can measure (at least roughly) the location of the self-apparatus based on the latitude/longitude information provided by a base station. On the other hand, a base station of a private network may not provide location information. In this case, a terminal cannot measure the location. Therefore, if the digital camera 101 needs to obtain the location information, it may determine that a wireless LAN connection is required to obtain the location information of the self-apparatus, and try to obtain the location information from a wireless LAN AP in the surroundings. Note that in this case, it suffices if the location information can be obtained, so a wireless LAN connection may not be necessarily required. For example, if the location information can be obtained from information such as a beacon notified by the AP, the digital camera 101 may determine that a wireless LAN connection is not required. Further, if the digital camera 101 has a GPS (Global Positioning System) function, it may determine that a wireless LAN connection is not required. In this case, the digital camera 101 may execute control so as to activate the GPS function if the GPS function is inactive.

Any one of the above-described methods may be selectively used, or they may be used in combination. By determining the necessity of a wireless LAN connection based on a plurality of determination criteria, it becomes possible to execute more precise connection control.

In this embodiment, a case has been described in which the connection destination of the digital camera 101 is a private network, but the connection destination is not limited to a private network. The above-described embodiment may be applied to a case in which the connection destination is a public network. For example, the wireless LAN connection control may be executed in a case in which the public network cannot be connected to the Internet due to its network characteristic or the public network has a network characteristic such as a communication speed lower than a defined value. In this case, the processing in step S402 can be omitted.

Further, in this embodiment, a case has been described in which the AP 104 constructs a network in the infrastructure mode, but the present invention is not limited to this. For example, the wireless LAN partner apparatus may not be the AP. In this case, a station that can operate as a GO (Group Owner) of Wi-Fi Direct and be connected to the Internet may be the wireless LAN partner apparatus. In this case, the digital camera 101 operates as a Client of Wi-Fi Direct, and can execute wireless LAN communication by being connected to another terminal operating as a GO.

Further, in the embodiment described above, a case has been described in which the wireless LAN compliant with the IEEE802.11 standard series is used, but the present invention is not limited to this. For example, not the wireless LAN but a network of another communication method such as Wireless USB, MBOA, Bluetooth®, UWB, or ZigBee® may be used. Note that USB is an acronym for Universal Serial Bus, MBOA is an acronym for Multiband OFDM Alliance, and UWB is an acronym for Ultra Wide Band. UWB includes Wireless USB, Wireless 1394, WINET, and the like.

The above-described method is also applicable to a case in which the digital camera 101 includes two or more wireless I/Fs each capable of executing cellular communication. For example, in a state in which the digital camera 101 is connected to one cellular network, it is possible to control the O/F for the other cellular network as in the above-described wireless LAN connection control.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-006221, filed Jan. 17, 2020, which is hereby incorporated by reference herein in its entirety.

What is claimed is:

1. A communication apparatus comprising:
at least one memory that stores a set of instructions; and
at least one processor that executes the instructions, the instructions, when executed, causing the communication apparatus to perform operations comprising:
connecting to a first communication network that is a cellular communication network,
determining whether the first communication network is a private cellular communication network or a public cellular communication network;
wherein in response to successful establishment of a connection to the public cellular communication network, the communication apparatus does not make an attempt to establish a connection to the second communication network; and
controlling,
in a case where it is determined that the first communication network is the private cellular communication network, to determine whether a connection to a second communication network different from the first communication network is required; and
in a case it is determined that a connection to the second communication network is required, make an attempt to establish a connection to the second communication network in a state in which the connection with the first communication network is maintained, and
in a case where it is determined that the first network is the public cellular communication a network, not to make an attempt to establish a connection to the second communication network,
wherein the controlling operations comprise, in a case where a connection to the second communication network is not to be made, such that processing related to connection establishment for the second communication network is not executed.

2. The communication apparatus according to claim 1, wherein
the first communication network is a communication network that cannot access a predetermined connection destination belonging to the second communication network different from the first communication network, wherein the second communication network can be accessed via an Internet.

3. The communication apparatus according to claim 1, wherein the operations further comprise determining, based on a PLMN ID (Public Land Mobile Network Identifier) transmitted from a base station of the first communication network, whether the first communication network is the public cellular communication network.

4. The communication apparatus according to claim 1, wherein the operations further comprise controlling a connection to the second communication network based on whether a frequency band used for communication in the first communication network is a predetermined frequency band.

5. The communication apparatus according to claim 1, wherein the operations further comprise controlling a connection to the second communication network based on whether location information can be obtained using the first communication network.

6. The communication apparatus according to claim 1, wherein
wireless LAN communication compliant with the IEEE802.11 standard series is executed via the second communication network.

7. The communication apparatus according to claim 1, further comprising a display, wherein the operations further comprise displaying, on the display, information related to control executed in the controlling.

8. The communication apparatus according to claim 1, wherein the operations further comprising:
   determining, in accordance with being connected to the first communication network, whether the first communication network is the private cellular communication network; and
   turning connection to the second communication network is attempted without accepting a user operation, in a case where it is determined that the first communication network is the private cellular communication network.

9. The communication apparatus according to claim 1, wherein in a case where the communication apparatus is connected to both the first communication network and the second communication network, the communication apparatus transmits data to an Internet via the second communication network, and transmits, via the first communication network, data to a closed network that is not physically/logically connected to the Internet.

10. A control method of a communication apparatus, the method comprising:
   connecting to a first communication network that is a cellular communication network,
   determining whether the first communication network is a private cellular communication network or a public cellular communication network;
   wherein in response to successful establishment of a connection to the public cellular communication network the communication apparatus does not make an attempt to establish a connection to the second communication network; and
   controlling,
      in a case where it is determined that the first communication network is the private cellular communication network, to determine whether a connection to a second communication network different from the first communication network is required; and
      in a case it is determined that a connection to the second communication network is required, make an attempt to establish a connection to the second communication network in a state in which the connection with the first communication network is maintained, and
      in a case where it is determined that the communication apparatus is in connection with the first communication network and the first network is the public cellular communication a public network, not to make an attempt to establish a connection to the second communication network,
   wherein the controlling operations comprise, in a case where a connection to the second communication network is not to be made, such that processing related to connection establishment for the second communication network is not executed.

11. A non-transitory computer-readable storage medium that stores a computer-readable instruction for causing, when executed by a computer included in a communication apparatus the computer to:
   connect to a first communication network that is a cellular communication network,
   determine whether the first communication network is a private cellular communication network or a public cellular communication network;
   wherein in response to successful establishment of a connection to the public cellular communication network the communication apparatus does not make an attempt to establish a connection to the second communication network; and
   control,
      in a case where it is determined that the first communication network is the private cellular communication network, to determine whether a connection to a second communication network different from the first communication network is required; and
      in a case it is determined that a connection to the second communication network is required, make an attempt to establish a connection to the second communication network in a state in which the connection with the first communication network is maintained, and
   in a case where it is determined that the first network is the public cellular communication a network, not to make an attempt to establish a connection to the second communication network,
   wherein the controlling operations comprise, in a case where a connection to the second communication network is not to be made, such that processing related to connection establishment for the second communication network is not executed.

* * * * *